(12) United States Patent
Schroeder et al.

(10) Patent No.: US 6,453,732 B2
(45) Date of Patent: *Sep. 24, 2002

(54) SIDE-MOUNT BRACKET SYSTEM FOR PROVIDING A LOCKED SENSOR POSITION

(75) Inventors: Thaddeus Schroeder, Rochester Hills; Robin Stevenson, Bloomfield, both of MI (US)

(73) Assignee: Delphi Technologies, Inc., Troy, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/361,839

(22) Filed: Jul. 27, 1999

(51) Int. Cl.$^7$ .............................................. G01M 15/00
(52) U.S. Cl. ...................................................... 73/116
(58) Field of Search ........................ 73/116, 115, 117.3, 73/146, 119 A; 248/246

(56) References Cited

U.S. PATENT DOCUMENTS

| | | | | |
|---|---|---|---|---|
| 4,033,601 A | * | 7/1977 | Lindahl et al. | 280/490 R |
| 4,436,351 A | * | 3/1984 | Kitrell | 312/223 |
| 4,463,835 A | * | 8/1984 | Murphy et al. | 188/52 |
| 4,566,316 A | * | 1/1986 | Takeuchi | 73/115 |
| 5,329,809 A | * | 7/1994 | Sellnau et al. | 73/115 |
| 5,747,677 A | * | 5/1998 | Tomisawa et al. | 73/115 |
| 5,951,191 A | | 9/1999 | Schroeder et al. | 403/13 |
| 6,070,865 A | | 6/2000 | Schroeder et al. | 269/47 |
| 6,123,301 A | | 9/2000 | Schroeder et al. | 248/200 |
| 6,139,211 A | | 10/2000 | Schroeder et al. | 403/13 |
| 6,176,636 B1 | | 1/2001 | Stevenson et al. | 403/13 |
| 6,272,747 B1 | | 8/2001 | Schroeder et al. | 29/888.01 |
| 6,338,190 B1 | | 1/2002 | Stevenson et al. | 29/434 |

* cited by examiner

Primary Examiner—Eric S. McCall
(74) Attorney, Agent, or Firm—Margaret A. Dobrowitsky

(57) ABSTRACT

A side-mount bracket system for locking the sensor position with respect to a side-mount bracket once the air gap is first established by the gauging layer method, wherein the sensor may be removed and then reinstalled without use of any position setting procedure, yet the air gap is automatically precisely reset to its original value. The side-mount bracket system according to the present invention includes a washer and a side-mount bracket having an elongated slot, wherein as the washer is brought into the slot, facial interaction therebetween, eg., teeth inscribing a smooth surface, causes the washer to be positionally fixed with respect to the bracket. Alternatively, the washer may be slidably trapped onto the bracket at the slot, and a tapered bolt having a varying cross-section which causes expansion of the washer as it is threaded home, thereby affixing the washer positionally with respect to the bracket.

24 Claims, 4 Drawing Sheets

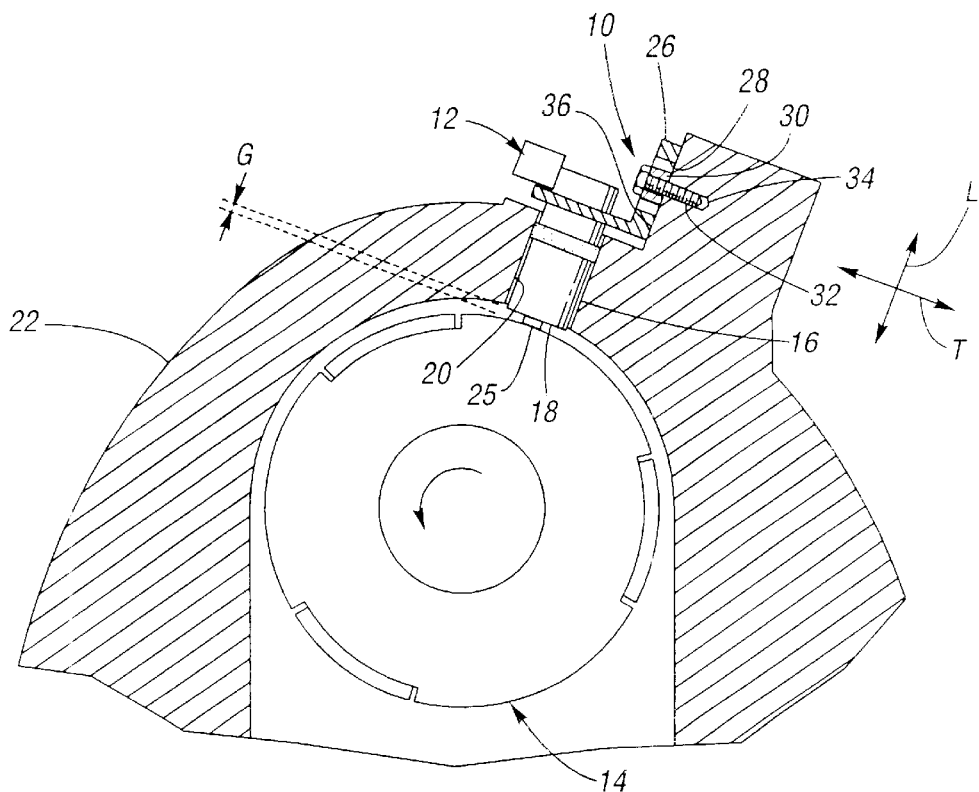
Fig. 1
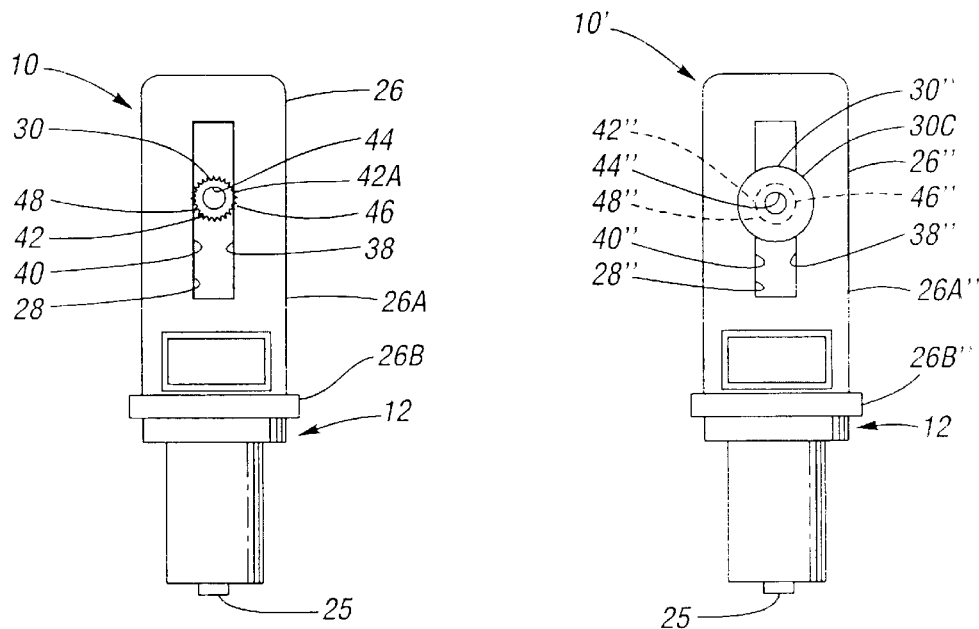
Fig. 2
Fig. 6

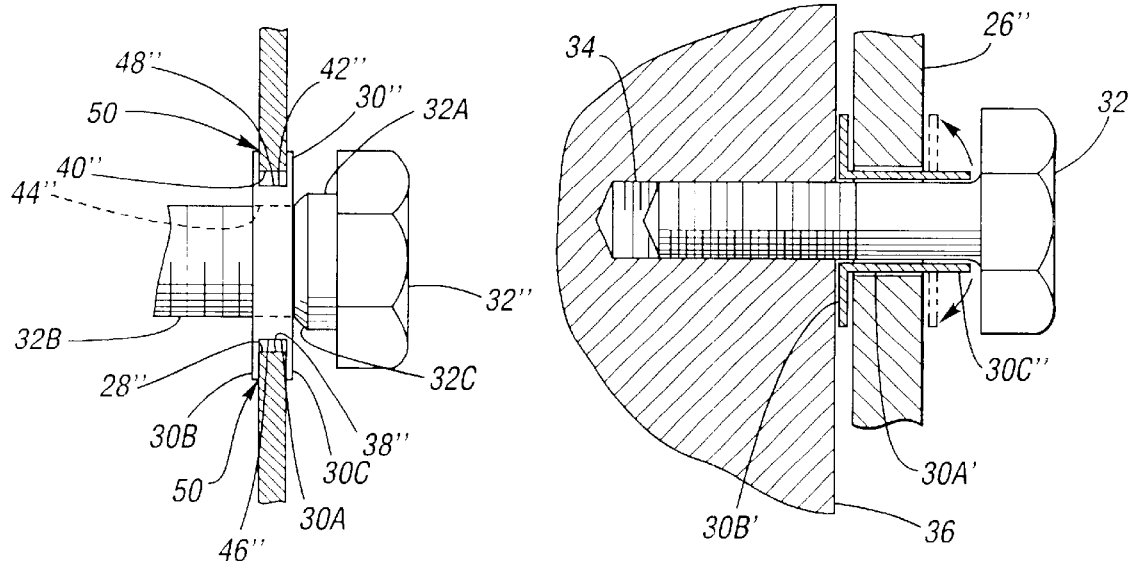
Fig. 8
Fig. 9
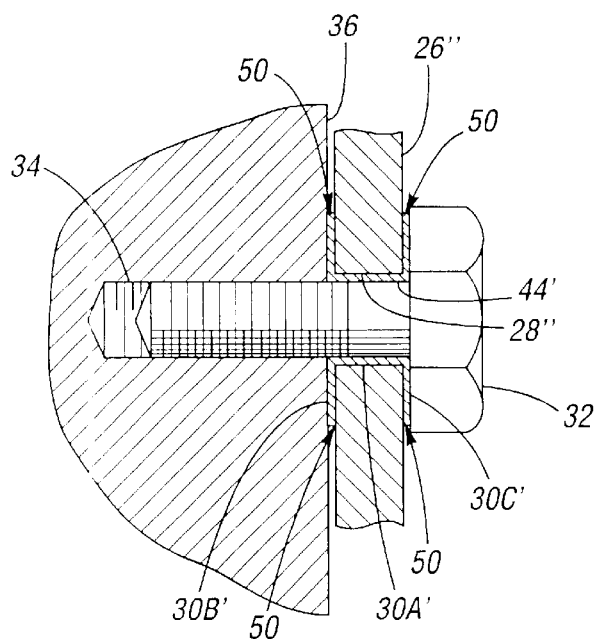
Fig. 10
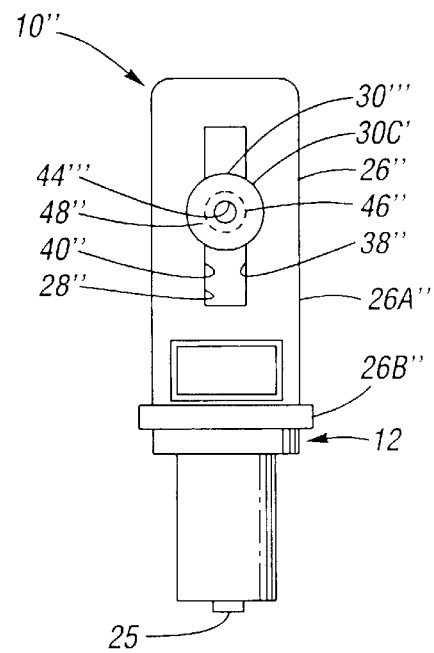
Fig. 11

SIDE-MOUNT BRACKET SYSTEM FOR PROVIDING A LOCKED SENSOR POSITION

TECHNICAL FIELD

The present invention relates to brackets for holding a first object with respect to a second object. More particularly, the present invention relates to a side-mount bracket for precisely locating a sensor relative to an object to be sensed. Still more particularly, the present invention relates to a side-mount bracket system, wherein facial interaction between a bracket and a washer results in the washer being fixed positionally with respect to the bracket. The present invention is further related to air gap setting methodologies incorporating abradable setting features, wherein the air gap thereby set is permanently captured at the side-mount bracket system.

BACKGROUND OF THE INVENTION

Magnetic sensors operate on the principle of detecting magnetic flux density modulation caused by the movement of appropriately configured reluctors (or targets). The magnetic sensor must be affixed very close to the reluctor since its sensitivity decreases very rapidly with the size of the air gap between the reluctor and the magnetic sensor. In most automotive applications, for example, the air gaps are on the order of 0.3 to 1.75 mm. Over such a range of air gaps, the sensor output signal decreases more than ten times. The signal attenuation at large air gaps makes the sensor operation more prone to noise induced failures as well as less accurate in detecting the elements of the reluctor as it spins in relation to the magnetic sensor. Both of these factors are often unacceptable in critical engine control and diagnostic applications.

It may at first glance appear that there would be no problem whatsoever to choose and achieve an appropriate air gap between the magnetic sensor and the reluctor. However, in the majority of production cases, the stack-up of tolerances of the many different components randomly influence the net size of the air gap, which consequently precludes achieving, at each assembly, a precisely predetermined air gap by mere assembly of the parts. As a result, because of the random variations caused by accumulation of tolerances, mere assembly of the parts risks damaging interference between the magnetic sensor and reluctor on the one hand, and inaccurate readings associated with too large an air gap on the other hand. To lessen all the tolerances so that mere assembly assures, at each assembly, the optimum air gap is physically unrealistic and involves inordinate costs associated with manufacturing such precise parts.

The majority of magnetic sensors used in automotive applications involve non-adjustable air gap placement, wherein the stack-up of tolerances causes deviation from the optimal air gap. For example, a rigid bracket is affixed to the body of a magnetic sensor. The magnetic sensor is placed into a sensor port in the engine block, and the bracket is bolted, via a bolt hole in the bracket, to a threaded mounting hole in a mounting surface of the engine block. When the bracket is bolted, the length of the sensor body from the bolt hole of the bracket to the sensor tip determines the air gap with respect to the reluctor, which air gap is affected by the stack-up of tolerances. Even though subject to tolerance related placement inaccuracy, this structural mounting methodology is used widely because of the simplicity of the hardware, and ease of assembly and service.

In situations where air gap variation cannot be tolerated, the air gap is preset during magnetic sensor installation by means of an adjustable bracket, often referred to as a "side-mount" bracket. The adjustability of side-mount brackets resides in a bolt slot which allows for the bracket to be adjusted along the slot elongation relative to the threaded mounting hole of the mounting surface.

In one form of operation of the side-mount bracket, the sensor body is placed into the sensor port of the engine block such that the sensor tip is allowed to touch the surface of the reluctor, and then it is withdrawn a distance equal to the predetermined optimum air gap. This method is more time consuming and is error prone.

In another form of operation of the side-mount bracket, a gauging layer of soft, abradable material is placed onto the sensor tip, wherein the thickness of the gauging layer is equal to the optimum air gap. The gauging layer may be either attached to the sensor body or be a part thereof, such as a protuberance, provided the sensor body is of a soft material. Now, the installer need merely place the sensor body into the sensor port until the gauging layer touches the reluctor, and then tighten the bolt on the mounting surface to thereby hold the sensor body at this position. During initial rotation of the reluctor, a portion of the gauging layer is sacrificial to abrasion due to reluctor run-out or differential thermal expansion without damage being incurred to the sensor body or the reluctor.

However, in the event the magnetic sensor must be re-installed, the abraded gauging layer cannot again provide position location for the sensor tip, as it was formerly able to do when it was unabraded. Therefore, before dismounting the magnetic sensor, the bracket must be marked to indicate the correct position of the bolt in the slot of the bracket so that when the "old" (original) magnetic sensor is re-installed, the original position of the bolt in the slot can be alignably sighted—not an exact procedure. Indeed, rather than try to reinstall the old, but still usable, sensor using the sighting method to reset the air gap, a technician would rather install a new sensor having the abradable layer intact, thereby circumventing the error prone sighting step otherwise needed to reinstall the old, but usable, sensor. This results in waste of otherwise good sensors and unnecessary expense for the customer or warranty provider. Accordingly, what remains needed in the art, is some way to eliminate the inherently error prone installation procedure of the sighting method, and enable precise and reliable resetting of the air gap during reinstallation of old, but still usable, sensors.

SUMMARY OF THE INVENTION

The present invention is a side-mount bracket system for locking the sensor position with respect to a side-mount bracket once the air gap is first established by the gauging layer method, wherein the sensor may be removed and then reinstalled without use of any position setting procedure, yet the air gap is automatically precisely reset to its original value.

The side-mount bracket system according to the present invention includes a washer and a side-mount bracket having an elongated slot, wherein as the washer is brought into the slot, facial interaction therebetween causes the washer to be positionally fixed with respect to the bracket. In this regard, either the slot sidewalls or the washer sidewalls are provided with teeth, the other of the sidewalls are smooth. The teeth are oriented parallel to the direction of insertion of the washer into the slot, referred to herein as the "transverse axis". The member having the toothed sidewalls is formed of a material harder than the member having the smooth sidewalls. The teeth of the toothed sidewalls may be provided in any suitable form, such as for example serrations, cutting ridges or cutting surfaces. A slight draft is preferred to be provided on the washer sidewalls to facilitate an initial engagement surface of the washer to be inserted into the slot with minimum interference by the slot sidewalls.

The washer and slot are dimensioned so that the sidewalls of the washer tightly abut the sidewalls of the slot, wherein the teeth of the toothed sidewalls inscribe corresponding grooves into the smooth sidewalls as the washer is pressed into the slot along the transverse axis. Consequently, as the corresponding grooves are inscribed, the washer sidewalls are caused to become positionally fixed with respect to the bracket along a "longitudinal axis" that is perpendicular to the transverse axis.

Operationally, a sensor body having a sensor tip provided with a gauging layer is placed into a sensor port of an engine block so that the gauging layer comes to rest upon a surface of a reluctor. The gauging layer thereupon immediately establishes the optimum air gap between the sensor and the reluctor along the longitudinal axis. A washer having a bolt hole sized to just fit a preselected bolt is slipped onto the bolt. With a side-mount bracket having an elongated slot preconnected with the sensor, the bolt carrying the washer is passed through the slot and threadably into a threaded mounting hole of the vertical surface. The washer and the slot have complementary sidewalls, wherein one is toothed, the other is smooth, such that the fit therebetween is interfering, wherein the toothed sidewalls score into the smooth sidewalls. Accordingly, as the bolt is tightened, the washer moves along the transverse axis, and facial interaction between the toothed and smooth sidewalls causes the washer to become fixed to the bracket, wherein the position of the sensor is fixed along the longitudinal axis.

During engine operation, a portion of the gauging layer is sacrificially lost to abrasion. However, should the sensor need to be removed and then again replaced, the washer remains fixed to the bracket, and all the installer need do is place the bolt through the mounting hole of the sensor body, through the bolt hole of the washer, and then threadably engage it into the threaded mounting hole of the vertical surface, and the preset air gap will be precisely re-established.

In a second embodiment, the washer may be slidably trapped onto the bracket at the slot, and a tapered bolt having a varying cross-section which causes expansion of the washer as it is threaded home, thereby affixing the washer positionally with respect to the bracket.

In a third embodiment, as a bolt is threaded tightly, annular flanges at either end of a washer are caused to be squeezed onto the bracket adjacent the slot, thereby affixing the washer positionally with respect to the bracket.

Accordingly, it is an object of the present invention to provide a side-mount bracket system which affixes a washer to a side-mount bracket at a positional location indicative of a preset air gap of a sensor attached to the bracket.

It is a further object of the present invention to provide a side-mount bracket system, wherein a predetermined facial interaction between the sidewalls of a slot of a side-mount bracket and the sidewalls of a washer capture a positional location of a sensor with respect to the bracket which is precisely reproducible.

It is another object of the present invention to provide a side-mount bracket system which operates in concert with a gauging layer air gap positioning methodology which retains the air gap setting whether or not any of the gauging layer is sacrificially abraded during operation.

These, and additional objects, advantages, features and benefits of the present invention will become apparent from the following specification.

BRIEF DESCRIPTION OF THE DRAWINGS

FIG. 1 is a partly sectional side view of the side-mount bracket system according to the present invention, shown in a typical environment of operation wherein a magnetic sensor is spaced from a reluctor a distance equal to an optimum air gap that is established by a gauging layer.

FIG. 2 is a front side view of a first embodiment of the side-mount bracket system according to the present invention.

FIG. 6 is a front side view of a second embodiment of the side-mount bracket system according to the present invention.

FIG. 8 is a detail, partly sectional side view of the second embodiment of the side-mount bracket system shown prior to full engagement of the tapered bolt.

FIG. 9 is a detail, partly sectional side view of a third embodiment of the side-mount bracket system, shown prior to full engagement of a bolt.

FIG. 10 is a detail, partly sectional side view of the third embodiment of the side-mount bracket system, shown after full engagement of the bolt.

FIG. 11 is a front side view of the third embodiment of the side-mount bracket system according to the present invention.

DESCRIPTION OF THE PREFERRED EMBODIMENT

Figure 3:
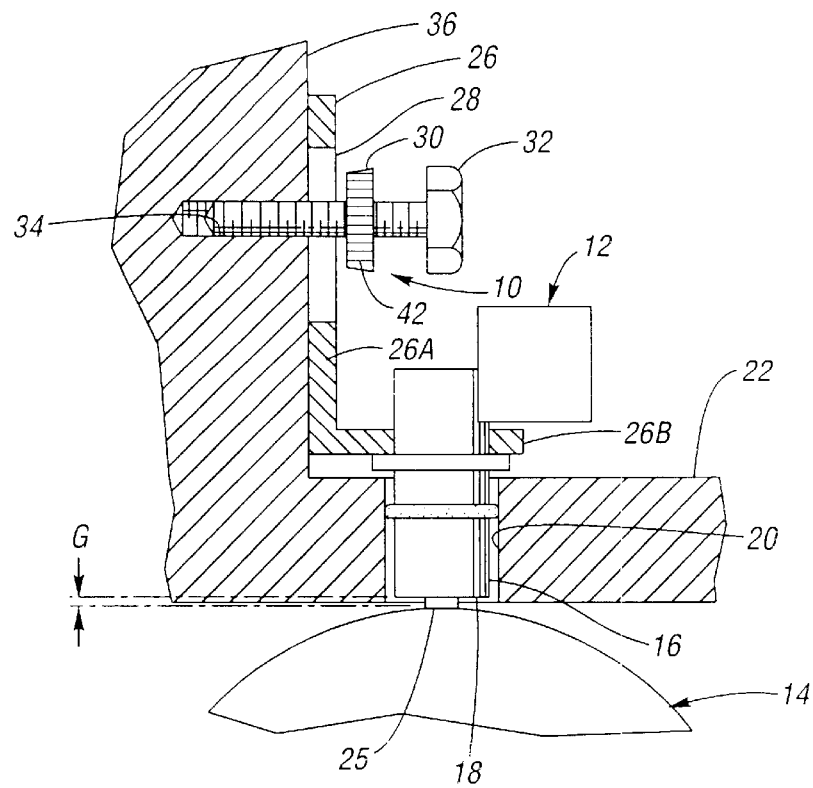
FIG. 3 is a partly sectional side view of the first embodiment of the side-mount bracket system, shown operationally prior to mutual engagement of the side-mount bracket and washer thereof.

Referring now to the Drawings, FIG. 1 generally depicts the side-mount bracket system 10 according to the present invention in an exemplar environment of operation, wherein the side-mount bracket system serves to locate a magnetic sensor 12 with respect to a reluctor 14. In this regard, the magnetic sensor 12 has a sensor body 16 which includes a sensor tip 18. The sensor tip 18 extends into a sensor port 20 of an engine block 22 and is spaced from the reluctor 14 a predetermined distance equal to an optimum air gap G which provides optimal sensing performance by the magnetic sensor of magnetic field variations as the reluctor spins.

The air gap G is defined when a gauging layer 25, which is attached to, or is a formed part of, the sensor tip 18 abuts the reluctor 14, as shown. The gauging layer 25 is composed of a soft abradable material which is sacrificed to abrasion as the reluctor rotates when differential thermal expansion or run-out causes the gauging layer to rub against the reluctor.

A side-mount bracket 26 (hereafter, simply "bracket") of the side-mount bracket system 10 is affixed to the sensor body 16. The bracket 26 may be L-shaped wherein a transverse leg is connected to the sensor body 16, as shown at FIG. 1, or flatly connected with the sensor body, having a configuration analogous to that of a flag and its flagpole. The bracket 26 has a slot 28 which is elongated along a longitudinal axis L that is parallel to the cylindrical axis of the sensor body 16, wherein the sensor tip 18 is oriented parallel to the longitudinal axis. A washer 30 of the side-mount bracket system 10 is dimensioned to fit into the slot 28 by a press-fit along a transverse axis T that is perpendicular to the longitudinal axis L. A bolt 32 carries the washer 30, passes through the slot 28 and threadably engages a threaded mounting hole 34 formed in a vertical mounting surface 36 (by the term "vertical" is meant oriented parallel to the center axis of the sensor port 20).

With reference now to FIGS. 2 through 8, the structure and function of the side-mount bracket system will be further described whereby the setting of the air gap G is automatically memorized by the bracket 26 and washer 30 as the washer is press-fit into the slot 28.

FIGS. 2 through 5 depict a first embodiment of the side-mount bracket system 10, which is considered most preferred, and is the form of the side-mount bracket system shown at FIG. 1.

The bracket 26 shown is of the L-shaped type, including a longitudinal leg 26A oriented parallel to the longitudinal axis and having the slot 28 formed therein, and further including a transverse leg 26B oriented parallel to the transverse axis and having connection to the sensor body 16. The slot 28 has a pair of opposing slot sidewalls 38, 40 oriented parallel to the longitudinal axis L (of FIG. 1) which are smooth.

The washer 30 is constructed of a harder material than that of the bracket 26 and has a bolt hole 44 for receiving therethrough a bolt 32 (as shown at FIG. 1). The washer 30 is annularly shaped, most preferably somewhat conically so as to have a reduced draft for ease of initial entry into the slot 28. The washer 30 is toothed, wherein the teeth 42 of opposing sidewalls 46, 48 respectively abut the sidewalls 38, 40 of the slot 28. The teeth 42 may be finely spaced or coarsely spaced, and may be in any suitable form, such as for example serrations, cutting ridges or cutting surfaces arranged parallel to the bolt hole axis.

As shown at FIG. 2, when the washer 30 is aligned over the slot 28, the crests 42A of the teeth of the washer sidewalls 46, 48 are located so as to overlap the sidewalls 38, 40 of the slot. Thus, for the washer 30 to be received into the slot 28, it must be press-fit therein, where during the teeth 42 inscribably cut or deform the slot sidewalls 38, 40. It is preferred for the washer to be annular in shape, but other shapes may be used, such as for example a rectilinear shape.

Figure 4:
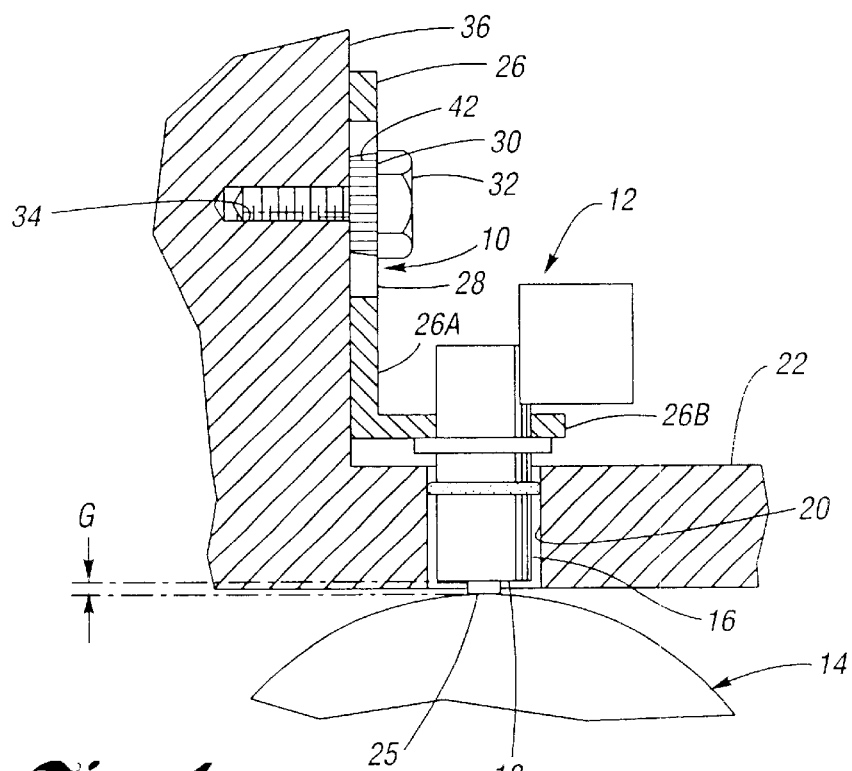
FIG. 4 is a partly sectional side view of the first embodiment of the side-mount bracket system, shown operationally after mutual engagement of the side-mount bracket and washer thereof.

FIGS. 3 and 4 depict the side-mount bracket system 10 in operation.

The installer grasps the magnetic sensor 12 and places the sensor tip 18 of the sensor body 16 into the sensor port 20 of the engine block 22 so that the gauging layer 25 touches the reluctor 14. The washer 30 is placed onto the bolt 32 and the bolt is placed through the slot 28 and then loosely threaded into the threaded mounting hole 34 of the vertical mounting surface 36, wherein the longitudinal leg 26A of the bracket 26 lies against the vertical mounting surface, until the washer sidewalls 46, 48 touch the slot sidewalls 38, 40 (see FIG. 2). The installer continues to thread the bolt into the threaded mounting hole, thereby causing the washer 30 to be pressed into the slot 28 along the transverse axis T. As the washer penetrates into the slot, the teeth of the washer sidewalls inscribe the smooth slot sidewalls. Because of the inscribing, the washer becomes fixed upon the bracket, and as a result of this facial interaction is prevented from moving independent of the bracket in the longitudinal direction.

Now, if the sensor 12 ever needs to be removed, it can later be reinstalled by simply running the bolt through the bolt hole of the washer, and the fixed position of the washer in relation to the bracket provides a memory of the prior preset air gap G.

Figure 5:
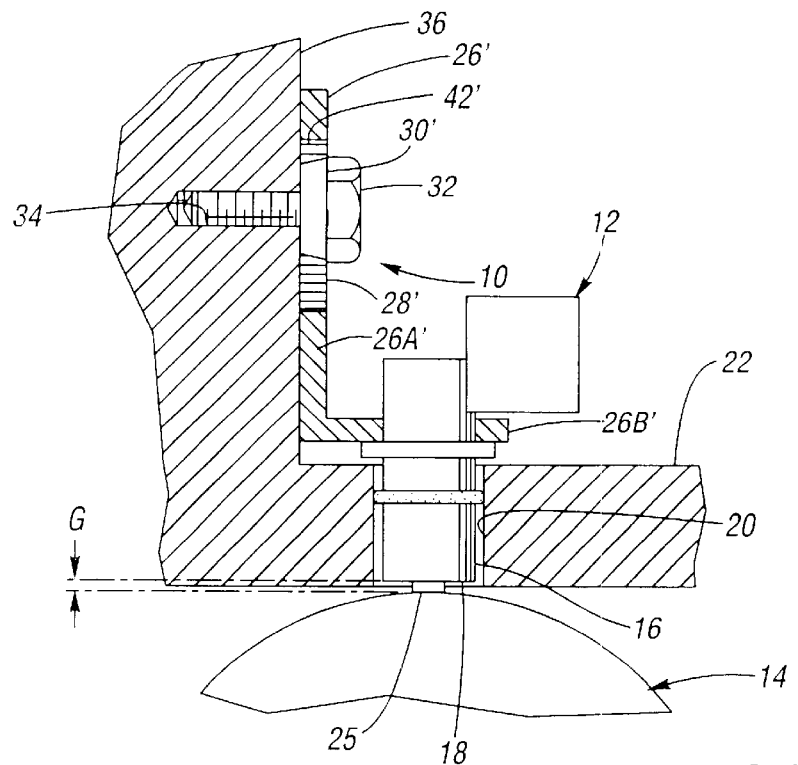
FIG. 5 is a partly sectional side view of a variation of the first embodiment of the side-mount bracket system, shown operationally after mutual engagement of the side-mount bracket and washer thereof.

FIG. 5 depicts a variation of the first embodiment of the side-mount bracket system 10, wherein the teeth 42' are located on the sidewalls of the slot 28' of the bracket 26' (having longitudinal and transverse legs 26A', 26B'), and wherein the sidewalls of the washer 30' are smooth. Operation is similar to that above recounted, wherein like numerals reference like features, and wherein the washer penetrates into the slot. Now, however, the harder teeth of the slot sidewalls inscribe the softer smooth washer sidewalls. Again, because of the inscribing, the washer becomes fixed upon the bracket, and is prevented from moving independent of the bracket in the longitudinal direction. And again, if the sensor ever needs to be removed, it can later be reinstalled by simply running the bolt through the bolt hole of the washer, and the fixed position of the washer in relation to the bracket (FIG. 2) provides a memory of the prior preset air gap G.

Figure 7:
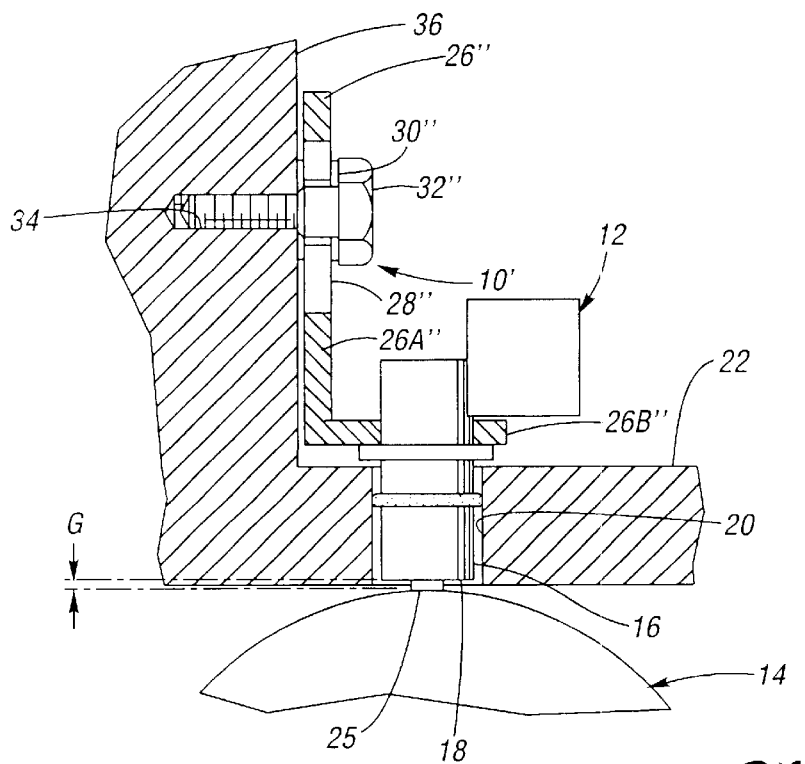
FIG. 7 is a partly sectional side view of the second embodiment of the side-mount bracket system, shown operationally after full engagement of a tapered bolt.

Turning attention now to FIGS. 6 through 8, a second embodiment of the side-mount bracket 10' will be detailed.

The bracket 26" is again shown as the L-shaped type, and includes a longitudinal leg 26A" having a slot 28" formed therein, and a transverse leg 26B" connected to the sensor body 16 of the sensor 12. The slot 28" has a pair of opposing slot sidewalls 38", 40" which are smooth.

The washer 30" has a relatively thin-walled, sleeve-like central portion 30A and a pair of annular flanges 30B, 30C (see FIG. 8) integrally connected at opposing ends thereof. The washer 30" is trapped with respect to the slot 28" (wherein the central portion is trapped in the slot) by the annular flanges 30B, 30C overhanging the sidewalls 38", 40", wherein the central portion 30A is sized so as to be slidable in the slot. At least one sidewall 46", 48" of the central portion 30A (or alternatively at least one of the sidewalls 38", 40" of the slot 28") is provided with teeth 42", wherein the teeth are harder than the opposing sidewall. To facilitate temporary placement of the washer 30" with respect to the slot, it is preferred for the surfaces of the annular flanges 30B, 30C facing the bracket and/or a portion of the bracket capable of contacting the annular flanges to provide a frictional interplay 50, such as by roughening.

A tapered bolt 32" is provided, having a larger diameter neck 32A, a narrower diameter threaded shank 32B and a taper 32C therebetween. The diameter of the central portion 30A and the bolt hole 44" of the washer 30" are coordinated with the dimensions of the slot 28" and the tapered bolt 32". In this regard, the threaded shank 32B of the tapered bolt 32" passes through the bolt hole 44" without causing distortion of the central portion 30A. However, when the neck 32A enters the bolt hole 44", the central portion 30A expands compressibly against the slot sidewalls which forces the teeth 42" to be driven into the smooth sidewall of the slot 28", and causes the washer 30" to become positionally fixed with respect to the bracket 26". The material of the washer 30" is selected so that if the tapered bolt 32" is removed, the expanded central portion remains permanently expanded and fixed with respect to the slot.

In operation, the installer grasps the magnetic sensor 12 and places the sensor tip 18 of the sensor body 16 into the sensor port 20 of the engine block 22 so that the gauging layer 25 touches the reluctor 14. The washer 30" is moved along the slot so that the bolt hole aligns with the threaded mounting hole 34 in the vertical surface 36. The threaded shank 32B of the tapered bolt 32" is now threaded into the threaded mounting hole 34. As the neck 32C enters the bolt hole 44", the central portion becomes expanded and the teeth bite into the slot sidewall to thereby fix the position of the washer with respect to the bracket, which, as a consequence of this facial interaction, is prevented from moving independent of the bracket in the longitudinal direction.

Now, if the sensor 12 ever needs to be removed, it can later be reinstalled by simply running the bolt through the bolt hole of the washer, and the fixed position of the washer in relation to the bracket (FIG. 6) provides a memory of the prior preset air gap G.

Turning attention now to FIGS. 9 though 11, a third embodiment of the side-mount bracket 10" will be detailed.

The bracket 26" is as recounted with respect to the second embodiment, again being of the L-shaped type, and including a longitudinal leg 26A" having a slot 28" formed therein, and a transverse leg 26B" connected to the sensor body 16 of the sensor 12. The slot 28" has a pair of opposing slot sidewalls 38", 40" which are smooth.

The washer 30'" now has a central portion 30A' with a first annular flange 30B' at one end and, at the other end, either a flangeable portion 30C" capable of becoming a second annular flange 30C' when crimped by the head of the bolt 32 as the bolt is tightened (FIG. 9), or a preformed second annular flange 30C' (FIG. 10). The washer 30'" is trapped with respect to the slot 28' when the annular flanges are both present (FIG. 10), wherein the annular flanges overhang the sidewalls 38", 40", and wherein the central portion 30A' is sized so as to be slidable in the slot. To facilitate affixing of the washer 30'" with respect to the slot when the annular flanges are crimped thereagainst, it is preferred for the surfaces of the annular flanges 30B', 30C' facing the bracket and/or a portion of the bracket capable of contacting the annular flanges to provide a frictional interplay 50, such as by roughening.

A bolt 32 is provided for passing through the bolt hole 44'" of the washer 30'". In this regard, the bolt 32 passes through the bolt hole 44'" without causing distortion of the central portion 30A'. However, when the bolt 32 is tightened into the threaded mounting hole 34, the annular flanges 30B', 30C' are caused to crimpably compress upon the bracket 26a, thereby affixing the washer 30'" to the bracket at that location. The material of the washer 30'" is selected so that if the bolt 32 is removed, the annular flanges remain permanently crimped against the bracket.

In operation, the installer grasps the magnetic sensor 12 and places the sensor tip 18 of the sensor body 16 into the sensor port 20 of the engine block 22 so that the gauging layer 25 touches the reluctor 14. Either the washer 30'" is inserted into the slot 28" via the flangeable portion 30C" or is pre-mated to the bracket by both annular flanges being already pre-formed. The washer 30'" is moved along the slot so that the bolt hole aligns with the threaded mounting hole 34 in the vertical surface 36. The bolt 32 is now threaded into the threaded mounting hole 34. As the bolt tightens, if the flangeable portion is present, an annular flange is formed thereof as it is flattened by the bolt head. As the bolt is further tightened (in any event the second flange now being present), the annular flanges become crimped against the bracket adjacent the slot, thereby frictionally affixing the position of the washer with respect to the bracket, which, as a consequence of this facial interaction, is prevented from moving independent of the bracket in the longitudinal direction.

Now, if the sensor 12 ever needs to be removed, it can later be reinstalled by simply running the bolt through the bolt hole of the washer, and the fixed position of the washer in relation to the bracket (FIG. 11) provides a memory of the prior preset air gap G.

It is to be understood that the facial interaction in the first and second embodiments is preferred to include teeth, but this is not required, so long as the facial interaction provided locks the washer in position relative to the bracket. For example roughening (ie., roughening 50) may be provided on the harder sidewalls in place of the teeth, where teeth are shown. Further, the flanges may be other than annular in shape, and that by the term "smooth" as used herein is meant that the surface is able to accept inscribing by the teeth as described hereinabove, whether or not the surface is actually physically smooth.

To those skilled in the art to which this invention appertains, the above described preferred embodiments may be subject to change or modification. Such change or modification can be carried out without departing from the scope of the invention, which is intended to be limited only by the scope of the appended claims.

What is claimed is:

1. A side-mount bracket system for retaining position of a washer relative to a bracket responsive to the washer being moved into a slot of the bracket, comprising:

a bracket having a slot, said comprising a hole through said bracket which is elongated along a longitudinal axis, said slot having opposing slot sidewalls disposed parallel to the longitudinal axis;

a washer having peripherally disposed opposing washer sidewalls;

means for receiving said washer into said slot, wherein said washer moves exclusively parallel to a transverse axis that is perpendicular to the longitudinal axis; and means for permanently deforming at least one of said washer and said bracket to provide a facial interaction between said washer and said bracket, wherein said facial interaction directly attaches said washer to said bracket at a fixed position in said slot independently of said means for receiving.

2. The side-mount bracket system of claim 1, wherein said washer has an initial bracket engagement surface; further wherein said washer sidewalls have a draft commencing at said initial bracket engagement surface.

3. The side-mount bracket system of claim 2, wherein said slot sidewalls are harder than said washer sidewalls; further comprising teeth on said slot sidewalls, wherein said washer sidewalls are substantially smooth, and wherein said facial interaction comprises said teeth inscribing said washer sidewalls parallel to the transverse axis as said washer is received into said slot.

4. The side-mount bracket system of claim 2, wherein said washer sidewalls are harder than said slot sidewalls; further comprising teeth on said washer sidewalls, wherein said slot sidewalls are substantially smooth, and wherein said facial interaction is provided by said teeth inscribing said slot sidewalls parallel to the transverse axis as said washer is received into said slot.

5. The side-mount bracket system of claim 1, further comprising a sensor having a sensor body, said sensor body having a tip, said sensor body being connected to said bracket so that said tip is oriented parallel to the longitudinal axis.

6. A side-mount bracket system for retaining position of a washer relative to a bracket, comprising:
   a bracket having an elongated slot, said slot comprising a hole through said bracket which is elongated along a longitudinal axis, said slot having opposing slot sidewalls oriented parallel to said longitudinal axis;
   a washer having a central portion, said central portion having a predetermined initial diameter wherein said washer is slidable in said slot along said slot sidewalls; and
   means for applying a force in a direction parallel to a transverse axis which permanently deforms said washer to provide a facial interaction between said washer and said bracket, wherein said facial interaction directly attaches said washer to said bracket at a fixed position of said slot independently of said means for applying, wherein said transverse axis is perpendicular to said longitudinal axis.

7. The side-mount bracket system of claim 6, further comprising teeth located on a harder one of said slot sidewalls and said central portion for inscribing a softer one of said slot sidewalls and said central portion; wherein the facial interaction comprises said washer being expanded by said means for deforming to a second diameter that exceeds said initial diameter to thereby cause the teeth to inscribe the softer of the slot sidewalls and the central portion.

8. The side-mount bracket system of claim 7, wherein said means for deforming comprises a tapered bolt threadably engageable with a threaded hole of an article; and wherein the tapered bolt comprises a threaded shank having a first cross-section, a neck having a second cross-section and a taper therebetween, wherein said second cross-section is larger than said first cross-section.

9. The side-mount bracket system of claim 8, wherein said central portion is trapped in said slot by flange means for overhanging said slot sidewalls adjacent said slot at opposing ends of said central portion.

10. The side-mount bracket system of claim 9, wherein said teeth are located at said slot sidewalls; and wherein said central portion is substantially smooth.

11. The side-mount bracket system of claim 9, wherein said teeth are located at said central portion; and wherein said slot sidewalls are substantially smooth.

12. The side-mount bracket system of claim 9, wherein said bracket and said washer have surfaces that provide a frictional interplay as said washer slides along said slot.

13. The side-mount bracket system of claim 9, further comprising a sensor having a sensor body, said sensor body having a tip, said sensor body being connected to the bracket so that said tip is oriented parallel to the slot sidewalls.

14. The side-mount bracket system of claim 6, further comprising a first flange located at one end of the central portion, and a second flange located at the other end of said central portion; wherein said means for deforming comprises a bolt threadably engaged in a threaded hole of an article, said facial interaction comprises said first and second flanges crimped upon said bracket adjacent said slot when the bolt is threadably tightened.

15. The side-mount bracket system of claim 14, wherein said bracket and said washer have surfaces that provide a frictional interplay when said first and second flanges of said washer are crimped upon said bracket.

16. The side-mount bracket system of claim 15, further comprising a sensor having a sensor body, said sensor body having a tip, said sensor body being connected to the bracket so that said tip is oriented parallel to the sidewalls.

17. The side-mount bracket system of claim 6, further comprising a first flange located at a first end of the central portion, and a flangeable portion at a second end of the central portion for being formable into a second flange located at the second end of said central portion in response to said means for deforming; wherein said means for deforming comprises a bolt threadably engaged in a threaded hole of an article, wherein threading of the bolt results in the flangeable portion being formed into the second flange, and wherein said facial interaction comprises said first and second flanges crimping upon said bracket adjacent said slot when the bolt is further threadably tightened.

18. The side-mount bracket system of claim 17, wherein said bracket and said washer have surfaces that frictionally interplay as said first and second flanges of said washer crimp upon said bracket.

19. The side-mount bracket system of claim 18, further comprising a sensor having a sensor body, said sensor body having a tip, said sensor body being connected to the bracket so that said tip is oriented parallel to the slot sidewalls.

20. A method for setting and locking an air gap of a sensor tip with respect to a reluctor, wherein the reluctor is rotatable with respect to an engine housing, said method comprising the steps of:
   providing a slot in a side-mount bracket, the slot comprising a hole through said bracket which is elongated in a longitudinal direction;
   connecting a sensor body of a sensor to the side-mount bracket, wherein a contact surface of a tip thereof is directed parallel to the longitudinal direction;
   placing the sensor body into a sensor port of an engine housing, wherein the contact surface contacts a reluctor and thereby sets an air gap between the reluctor and the tip;
   passing a fastener through a hole in a washer; and
   securing the fastener to a vertical surface connected with the engine housing to thereby secure the side-mount bracket to the engine housing, where during a force is applied to said washer in a direction parallel to a transverse axis to thereby provide a facial interaction between the washer and the slot which causes a permanent deformation that directly attaches the washer to the side-mount bracket at a fixed position of said bracket so as to lock the air gap independently of the contact surface and independently of the force.

21. The method of claim 20, wherein said steps of passing and securing comprise:
   passing a bolt through a bolt hole of the washer; and
   threading the bolt into a threaded mounting hole of the vertical surface to thereby cause the washer to be pressed into the slot;
   wherein a toothed surface of one of the washer and the slot inscribes a substantially smooth surface of one of the washer and the slot to thereby provide said facial interaction.

22. The method of claim 20, wherein said steps of passing and securing comprise:
   passing a tapered bolt through the washer, wherein the tapered bolt has a neck; and
   threading the tapered bolt into a threaded mounting hole of the vertical surface to thereby cause the neck of the tapered bolt to permanently expand the washer compressibly against the slot;

wherein a toothed surface of one of the washer and the slot inscribes a substantially smooth surface of one of the washer and the slot to thereby provide said facial interaction.

23. The method of claim 20, wherein said steps of passing and securing comprise:

passing a bolt through a central portion of the washer; and threading the bolt into a threaded mounting hole of the vertical surface to thereby cause the bolt to permanently crimp flanges formed at each end of the central portion compressibly against the bracket adjacent the slot to thereby provide said facial interaction.

24. The method of claim 23, wherein during said step of threading, a flangeable portion of the washer deforms into a flange at one end of the central portion.

* * * * *